United States Patent [19]
Yabuki

[11] Patent Number: 5,246,478
[45] Date of Patent: Sep. 21, 1993

[54] APPARATUS FOR CUTTING MOLTEN GLASS FOR FORMING GLASS PRODUCTS

[76] Inventor: Youichi Yabuki, 7-27-405, Hikawadai 2-chome, Nerima-ku, Tokyo, Japan

[21] Appl. No.: 810,881
[22] Filed: Dec. 20, 1991
[51] Int. Cl.$^5$ .............................................. C03B 7/10
[52] U.S. Cl. ...................................... 65/334; 65/332; 83/328
[58] Field of Search ................ 65/123, 133, 332, 334; 83/321, 327, 328, 646, 647.5

[56] References Cited

U.S. PATENT DOCUMENTS

| 1,913,153 | 6/1933 | Salardi | 83/328 |
| 2,090,082 | 8/1937 | Wadsworth | 83/327 |
| 3,786,707 | 1/1974 | Becker et al. | 83/328 |

FOREIGN PATENT DOCUMENTS

| 2126825 | 6/1972 | Fed. Rep. of Germany . |
| 2014128 | 8/1979 | United Kingdom . |
| 2174693 | 11/1986 | United Kingdom . |

Primary Examiner—Joye L. Woodard
Attorney, Agent, or Firm—Wenderoth, Lind & Ponack

[57] ABSTRACT

At least a pair of shear blades cuts a stream of viscous molten glass descending from a glass feeder. The paired shear blades continuously move, while retaining a substantially horizontal position, about a horizontal axis along looped paths symmetrical to each other on opposite sides of the descending stream of molten glass. When viewed in a vertical plane, each loop represents the forward motion of each blade toward the center of the descending stream of molten glass, the crossing of the cutting edges provided on the two facing blades, and the retreat of each blade away from the center of the glass stream. The cutting of glass stream begins at the end of the forward motion of the shear blades and ends when the cutting edges provided on them have crossed each other. This permits the area and time of contact between the shear blades and the descending stream of molten glass to be minimized.

11 Claims, 4 Drawing Sheets

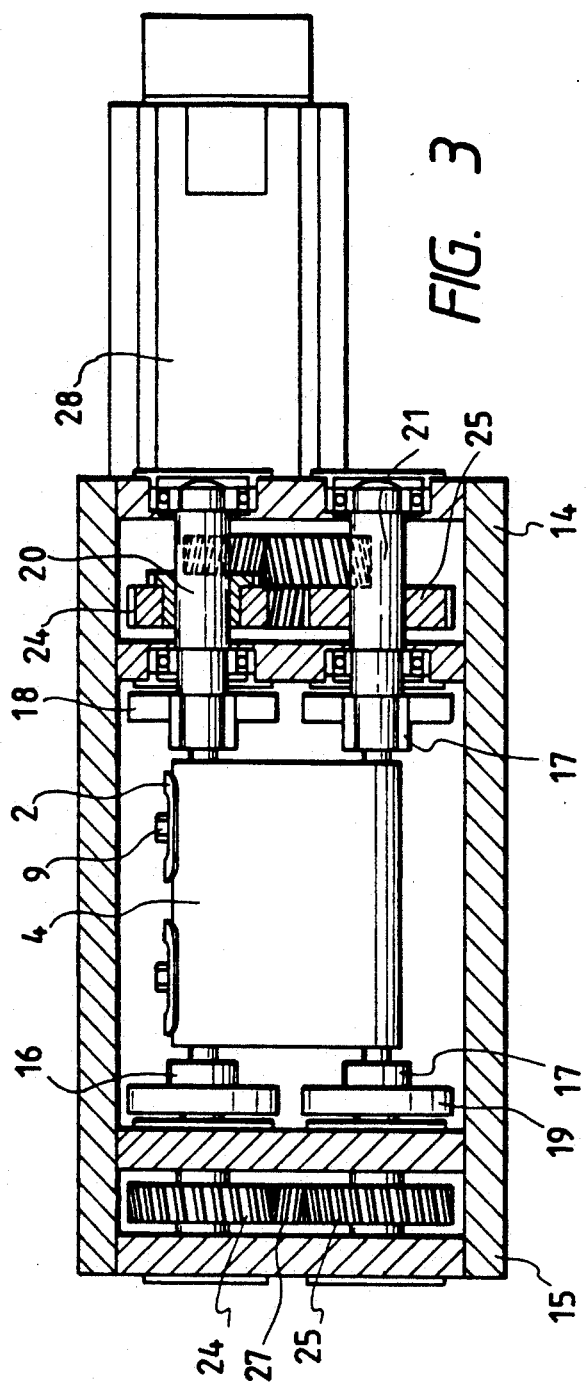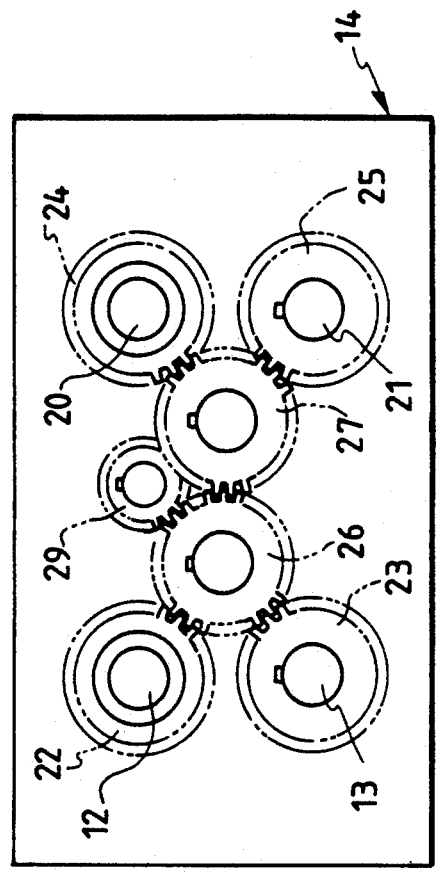

APPARATUS FOR CUTTING MOLTEN GLASS FOR FORMING GLASS PRODUCTS

BACKGROUND OF THE INVENTION

1. Field of the Invention

This invention relates to a method and apparatus for cutting a stream of viscous molten glass descending from a glass feeder into gobs of optimum size for the forming of various types of glass products such as bottles, tableware and other glass containers and optical lenses.

2. Description of the Prior Art

A process to make such typical glass containers as beer and milk bottles will be briefly described in the following. First, a mixture of ingredients is melted in a melting furnace to produce liquid glass that is then fed into a glass feeder below the furnace. The glass feeder has an orifice through which a continuous stream of viscous molten glass flows downward. Gobs (or lumps of viscous molten glass) are then made by cutting the descending stream of viscous molten glass at given intervals by means of a gob cutter. Each gob falls into a preliminary mold of bottle-making machine waiting below where it is formed into a parison, which, in turn, is then finished into a product bottle in a final mold.

The gob cutter comprises a pair of flat blades, each having a V-shaped cutting edge at the forward end thereof. The descending stream of viscous molten glass is cut into gobs by means of the oppositely disposed blades that are moved horizontally to pass across (and overlap) each other.

The cutting of the viscous molten glass by the blades has conventionally been performed in two broadly classified ways. One of them uses two arms having ends which pivot horizontally, with respect to the axis thereof, along an arched path like the blades of the scissors. At least a pair of facing blades are attached to the other ends of the two arms. Cutting is performed by crossing the opposing blades by moving the arms like the blades of scissors are moved.

The other one uses two horizontal blades fastened to two carriages that are reciprocatably held by a guide member so that the blades face each other. Viscous molten glass is cut into gobs by the linear horizontal motion of the oppositely disposed blades.

In these conventional methods, viscous molten glass is cut halfway in its descending stream by means of the blades that move along either an arched or a linear path in a horizontal plane. In each cutting operation, the two blades, which horizontally move and cross each other, pause twice; first in making a cut and then before moving again after a retreat from the cutting position. These pauses in the reciprocating cutting cycle not only disturb a continuous operation but also cause the vibration of the blade moving mechanism which increases as the moving speed of the blades increases. This barrier limits the operation speed of the horizontal reciprocating blades. With the conventional methods, therefore, the gob cutting and bottle making efficiency cannot be increased beyond a certain limit. A maximum gob cutting speed with one of the most productive methods of the linear horizontal motion type is about 250 pieces per minute.

Shear mark, which is a crease formed in the top and bottom ends of a gob cut from a stream of viscous molten glass, is a serious problem with glass products. As its presence lowers the quality of a product, it is desirable to reduce shear mark to a minimum. Shear mark results from the contact between the blades and viscous molten glass, so that its incidence increases as the duration of contact therebetween increases. As the blades in retreat are cooled, a long contact time provides a favorable condition for the forming of shear mark. To decrease the formation of shear mark, accordingly, it is essential to increase the cutting speed and shorten the contact time between the blades and glass. Because of the mechanical limit described before, however, it has been practically difficult to increase the cutting speed and decrease the formation of shear mark.

A typical example of a conventional linear cutting apparatus is disclosed in U.S. Pat. No. 4,215,611. This apparatus is designed to increase the cutting efficiency by making cutting strokes with the aid of an air cylinder. The apparatus also has a mechanism to tilt one of the paired blades when excess tension works thereon when they overlap each other in a cutting operation. But even this improved linear cutting apparatus is not free from the pauses of the blades. Accordingly, the limit on productivity improvement has remained unremoved and the aforementioned problems unsolved. While necessitating a complex control mechanism, in addition, this improved apparatus has also suffered from limited durability of its component parts.

SUMMARY OF THE INVENTION

An object of this invention is to provide a method and apparatus for cutting a descending stream of viscous molten glass by which the stream of molten glass is efficiently and smoothly cut by the contact of cutting blades alone that move continuously, without pausing, in a horizontal position without moving against the flow of the glass.

Another object of this invention is to provide a method and apparatus for producing good-quality gobs of viscous molten glass free of shear mark and other defects by minimizing the duration of contact between the blades and molten glass by increasing the moving speed of the blades in cutting.

Still another object of this invention is to provide a method and apparatus for cutting a descending stream of viscous molten glass at a higher speed than before, with a capability of producing gobs of any desired shape by adjusting the moving speed of the blades in cutting.

In order to achieve the above objects, a method of cutting viscous molten glass into gobs for making glass products according to this invention, in which a stream of molten glass descending from a glass feeder is cut into gobs of a predetermined size by means of at least a pair of facing blades disposed directly below the glass feeder, is characterized in that:

the paired blades to perform a cutting operation move along symmetrical vertical loops centered around the descending stream of molten glass while retaining a substantially horizontal position;

the loops traced by the facing blades contain, when viewed in a plane, the forward movement of the blades toward the center of the descending stream, the crossing of the cutting edges on the facing blades, and the retreat of the blades away from the center of the descending stream; and the cutting of molten glass begins when the forward movement of the facing blades ends and is completed when the cutting edges on the blades have crossed each other.

The shape of the gobs made by the cutting method of this invention can be varied by adjusting the turning speed of the blades in cutting relative to the descending speed of the molten glass.

The turning speed of the blades along the loops according to this invention can also be varied at different stages of the cutting operation.

An apparatus for cutting a descending stream of viscous molten glass into gobs for making glass containers by means of at least a pair of facing blades held in a horizontal position directly below a glass feeder on opposite sides of the descending stream of glass is provided according to this invention. The apparatus comprises a pair of facing holders to fix the base ends of the blades so that the opposite ends thereof, where cutting edges are provided, protrude toward the descending stream of molten glass, and a drive mechanism interlocked with the paired holders to cause the holders to move, when viewed sidewise from the center of the descending stream of molten glass, along looped paths without changing the vertical orientations thereof.

The drive mechanism should preferably comprise two crank arms which are pivoted to the top and bottom of each holder and which are adapted to make the same motions and a group of gears that cause the corresponding crank arms on opposite sides of the descending stream of molten glass to make symmetrical motions.

The group of gears should preferably comprise gears fastened to both ends of the crank arms, and a drive gear that meshes directly with the gears on one holder and indirectly with the gears on the other holder through an intermediate gear.

The cutting method and apparatus of this invention just described permits the cutting of a descending stream of viscous molten glass at a maximum speed permissible with the apparatus, with a resulting marked increase in the number of gobs cut in a unit length of time and in the productivity of glass products. For example, this invention has approximately tripled the production rate of gobs from about 250 pieces per minute to 700.

With the duration of contact between the cutting blades and molten glass greatly reduced, in addition, the blades used with the method and apparatus of this invention are now of simpler design and have longer durability than before.

BRIEF DESCRIPTION OF THE DRAWING

FIG. 3 is a view looking in the direction of the arrow Y—Y in FIG. 1.

FIG. 4 shows a group of gears in a gear box shown in FIG. 1.

DESCRIPTION OF THE PREFERRED EMBODIMENT

Now a preferred embodiment of this invention will be described by making reference to the accompanying drawings.

Figure 1:
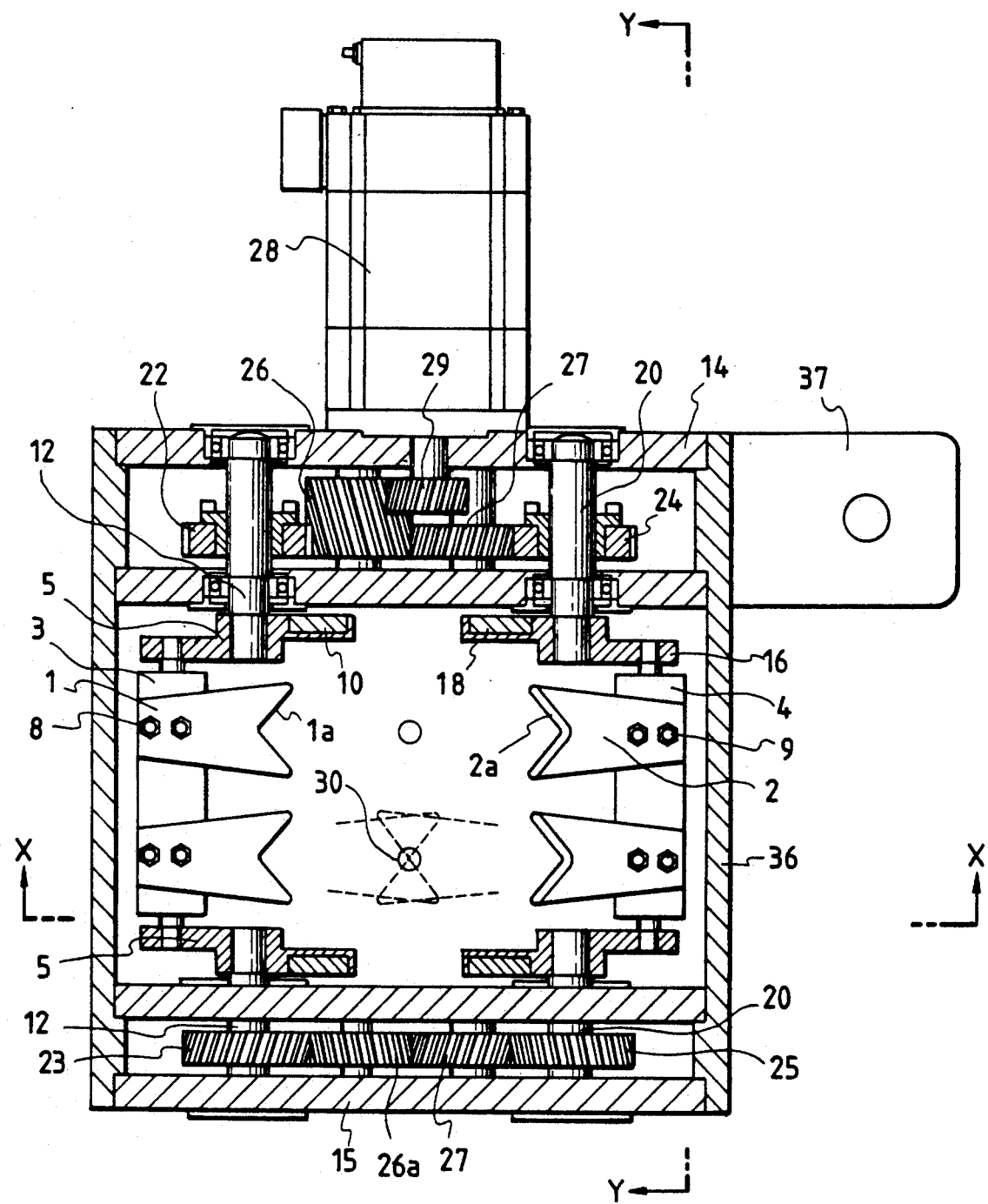
FIG. 1 is a plan view showing a molten glass cutting apparatus embodying the principle of this invention.
Figure 2:
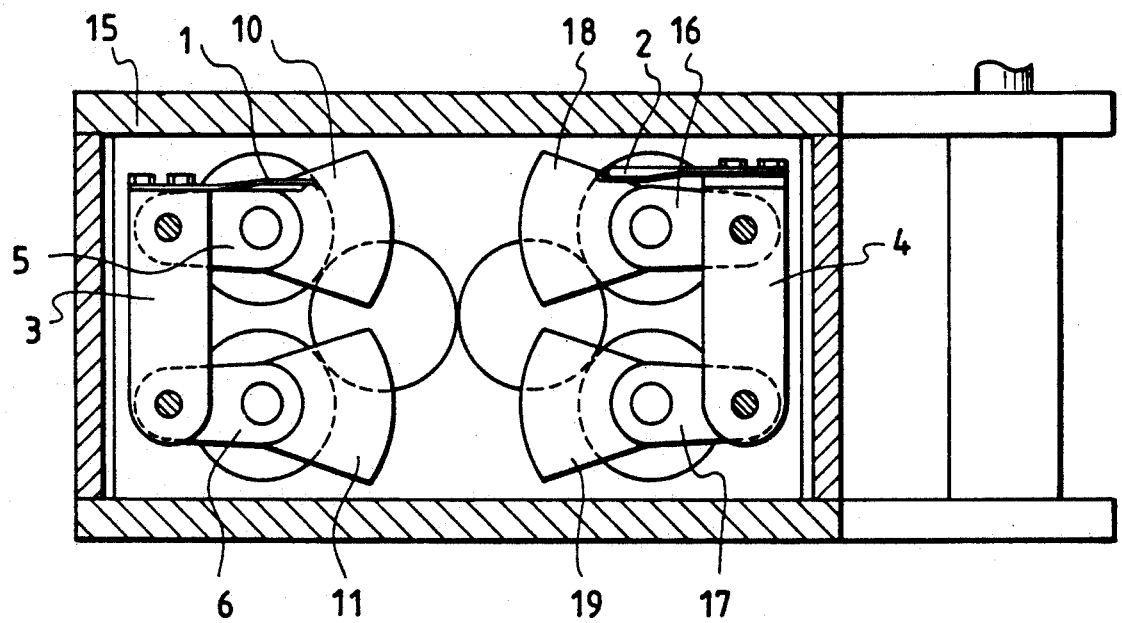
FIG. 2 is a view looking in the direction of the arrow X—X in FIG. 1.

FIGS. 1, 2 and 3 show a two-strand cutting apparatus having two pairs of shear blades. Two bottom shear blades 1 are bolted to the upper end of a blade holder 3 by bolts 8, with the blades positioned at right angles to the axis of the holder. Each blade 1 is attached to the holder 3 in a horizontal position, with a cutting edge 1a provided thereon jutting out of the holder. Another blade holder 4 is provided parallel to the holder 3. Two top shear blades 2 are similarly fastened to the upper end of the holder 4 with bolts 9. The bottom shear blades 1 on one holder 3 and the top shear blades 2 on the other holder 4 are disposed to face each other while being kept slightly out of alignment vertically, with the sharpened edge surfaces thereof looking in opposite directions as shown in FIG. 2. Each pair of facing blades constitutes a molten glass shearing unit. Shear blades worn or damaged during service are replaceable.

As shown in FIGS. 2 and 3, the holders 3 and 4 are vertically elongated block-like members which carry the blades on the flat top surfaces thereof. While in the illustrated embodiment the shear blades are carried on the top surface of the holders, the blades may be fastened at vertical mid-points of the holders.

The holders 3 and 4 are connected to holder drive mechanisms at both ends of the axles thereof. The holder 3, for example, is pivotally supported by crank arms 5 and 6 at the top and bottom ends thereof. The crank arms 5 and 6 have counterweights 10 and 11 at the ends thereof opposite to where the holder 3 is supported and are fastened to crank shafts 12 and 13. The crank shafts 12 and 13 are connected to gear boxes 14 and 15 through bearings, etc. The other holder 4 also has crank arms 16 and 17, counter-weights 18 and 19, and crank shafts 20 and 21. The gear box 14 is connected to one end of the two holders 3 and 4, thereby pivotally supporting four crank shafts. The other gear box 15 is connected to the other end of the same holders, similarly supporting four crank shafts.

Each gear box contains gears to move the crank arms. FIG. 4 shows an assembly of gears contained in the gear box 14. Four helical gears 22, 23, 24 and 25 are connected to the individual crank shafts. Of these, the gears 22 and 23 mesh with a drive gear 26. An intermediate gear 27 meshes with the drive gear 26 and the helical gears 24 and 25. The drive gear 26 in the gear box 14 meshes with an output gear 29 that is directly rotated by an alternating-current servomotor 28. The paired holders 3 and 4 are thus rotated vertically along a given path about the crank shafts without changing their vertical orientation and symmetrically to each other on opposite sides of the center axis of the descending stream of molten glass. The helical gears may be replaced with spur gears. As shown in FIG. 4, the drive gear 26 and intermediate gear 27 have their axes on a line extending midway between the helical gears 22 and 23, and midway between the helical gears 24 and 25, such that the axes of gears 22, 23 and 26 form an isosceles triangle, the axes of gears 24, 25 and 26 form an isosceles triangle, and the axes of gears 24, 25 and 27 form an isosceles triangle. The base lines of each of these isosceles triangles extends either between the axes of gears 24 and 25 or the axes of gears 22 and 23.

Of the four helical gears 22, 23, 24 and 25, the lower gears 23 and 25 are keyed to the crank shafts 13 and 21, whereas the upper gears 22 and 24 are not keyed to the crank shafts 12 and 20. Instead, a wedge-shaped mechanical locking device or other similar means to free and lock the gears 22 and 24 as required is provided therebetween. With this provision, smooth gear meshing can be achieved by first adjusting the position of the gears 22 and 24 in a free state and then locking them in position.

The other gear box 15 also contains a similar group of gears. But no drive gear is provided therein. Instead, a driven gear 26a, which is moved by the drive gear 26 in the gear box 14, is provided to mesh with gears 22 and 23 and an intermediate gear 27. A cutting apparatus of this invention is made up of the holders held between the gear boxes 14 and 15 that are fastened to an appropriate frame 36 as shown in FIG. 1. The cutting apparatus is attached to some other member and appropriately positioned by means of a fastening bracket 37.

Following the motion of the holders 3 and 4, the shear blades 1 and 2 rotate vertically (i.e. about a horizontal axis along a given path. In each cycle of their motion viewed in a plane, the facing blades 1 and 2 move forward toward the descending stream of molten glass 30, cross each other at the center of the descending stream 30 (at a point indicated by the dashed lines in FIG. 1), and then retreat. At the intersection, the descending stream of molten glass 30 is cut by means of the top and bottom blades 1 and 2 that are slightly out of alignment from each other vertically.

Figure 5:
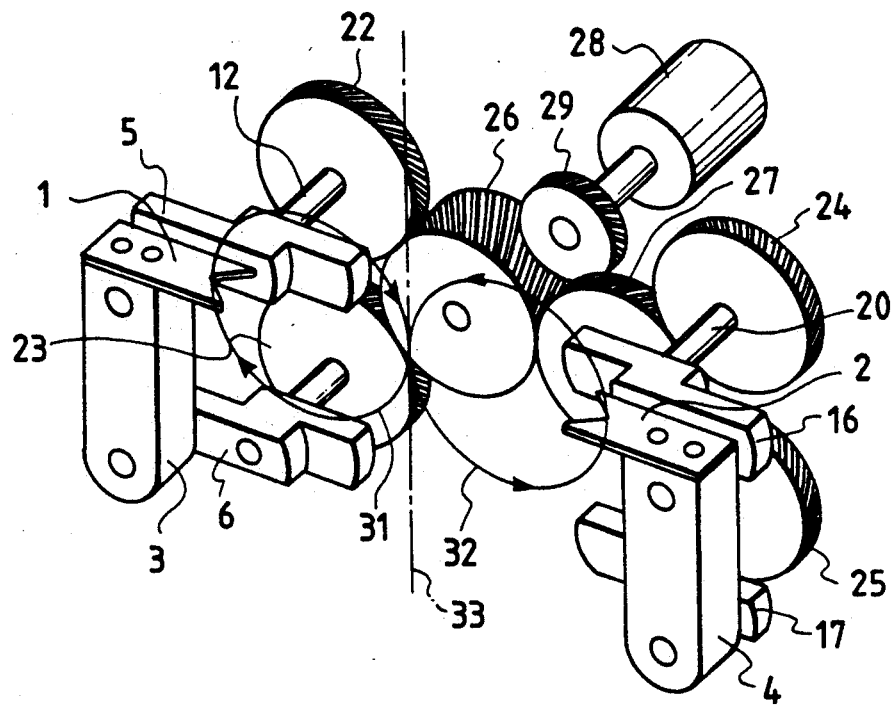
FIG. 5 schematically shows a concrete example of a gear mechanism to actuate the cutting blades according to this invention.

FIG. 5 schematically shows an assembly of the holders, crank arms, crank shafts and gears that causes the blades to move along the characteristic path of this invention. For ease of understanding, only one pair of shear blades and a gear assembly on the drive motor side are shown. The drive gear 26 rotated by the output gear 29 of the drive motor 28 meshes with two crank arm rotating gears 22 and 23 that move one holder 3 (shown at the left) and an intermediate gear 27. The intermediate gear 27 meshes with two crank arm rotating gears 24 and 25 that move the other holder 4 (shown at the right). To ensure smooth motion and keep the balance of weight, the counterweights 10 and 11 are attached to the crank arms 5 and 6 and the counterweights 18 and 19 are attached to the crank arms 16 and 17.

When the drive gear 26 is turned in the direction of the arrow (counterclockwise) by means of the drive motor 17, the gears 22 and 23 meshed therewith rotate clockwise to turn the crank arms 5 and 6 at the left and the holder 3 in the same direction. As a consequence, the shear blade 1 moves clockwise along a vertical circular path 31 with a given radius. On the other hand, the gears 24 and 25 at the right move counterclockwise through the intermediate gear 27 to turn the holder 4 in the same direction. Then, the shear blade 2 moves counterclockwise along a vertical circular path 32. The two circular paths 31 and 32 are symmetrical to each other on opposite sides of the descending stream 33 of molten glass.

The following paragraphs describe the cutting operation of viscous molten glass performed by the apparatus just described.

Viscous molten glass in the glass feeder begins to flow downward intermittently as a plunger therein is moved up and down by means of a plunger motor. The alternating-current servomotor actuated by the starting signal from the plunger motor moves the blades to make each cycle of motion through the individual gears, crank arms and holders. Thus, the blades cut the descending stream of molten glass directly below the glass feeder, once in each cycle.

Figure 6:
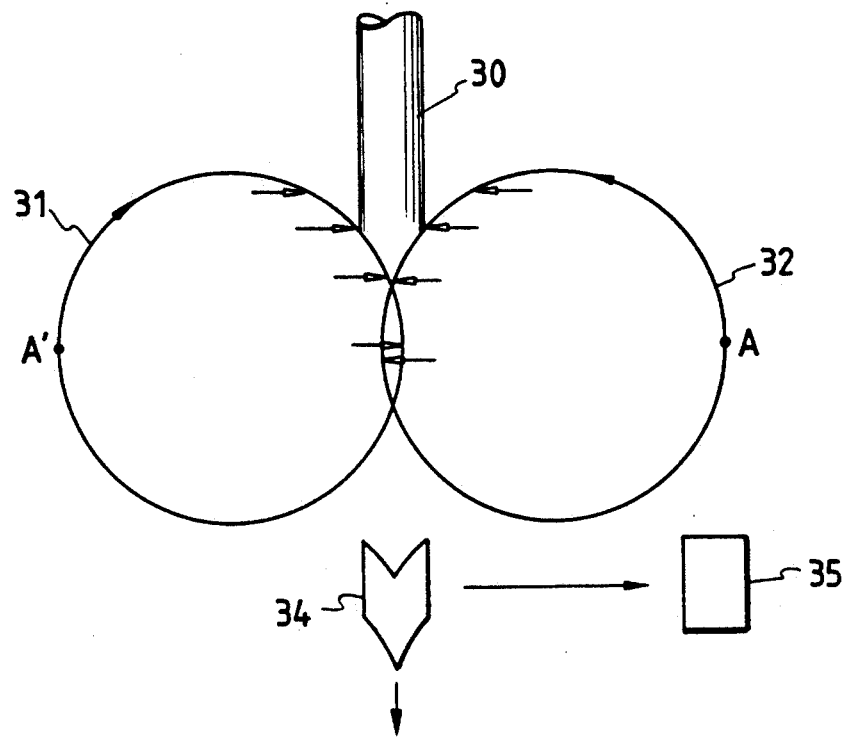
FIG. 6 schematically shows the cutting condition of molten glass according to this invention.

FIG. 6 shows how the descending stream of molten glass is cut into a gob. The facing blades start to move at points A and A' on the circular paths 31 and 32 that are farthest away from the descending stream of molten glass. After passing the uppermost points, the blades descend toward the descending stream of molten glass 30 until the cutting edges 1a and 2a thereon come in contact with each other from opposing sides of the descending stream 30, while maintaining their horizontal position, to start cutting. The cutting of glass is completed when the blades cross each other at the center of the descending stream 30 (overlapping each other by about 1 to 2 mm). After passing the farthest points, the blades descend and move away from each other and from the descending stream of molten glass 30. From the lowermost points, the blades move upward back to the starting points A and A' to complete one cycle of motion.

Assuming that the molten glass is at a standstill, a gob 34 cut therefrom will have a point that juts out substantially triangularly along the moving paths of the blades as shown in FIG. 6. Assuming then that the molten glass descends at the same speed as the blades, the glass will be cut substantially horizontally, with the resulting gob shaped like the one designated by reference number 35. When the blades descend faster than the stream of molten glass, gobs shaped like inverted circular cones of varying lengths are obtained. When the descent of the blades is slower than that of the steam of molten glass, conically shaped gobs are produced. As such, gobs of desired shapes, and glass products of corresponding shapes, can be produced by relatively changing the descending speed of the molten glass and the rotating speed of the blades between the start and completion of the cutting cycle.

Predetermined quantities of molten glass are cut into gobs by selecting an appropriate combination of the operating time of the shear blades in each cycle and the descending speed of the molten glass. The volume (or size) of gobs can be adjusted by changing the cycle time of the blade rotation while keeping the descending speed of molten glass constant.

Furthermore, this invention permits a fine control of the blade speed at different stages of each cycle by means of a pulse control through the alternating-current servomotor. For example, the travel of the blades is kept at an optimum level to produce gobs of a desired shape between the start and completion of cutting. On completion of cutting, the blade travel speed is increased to quickly bring the blades out of contact with the descending stream of molten glass. When the blades have come out of contact with the stream of glass, their travel speed is lowered. All this can be done without changing the total time of a cycle. Similar control can be achieved by mounting an elliptical gear on the drive shaft of the motor, instead of employing the pulse control.

The path of the blade travel in the embodiment described herein is circular. With the use of a cam or other mechanisms, however, the blades can travel along paths of various shapes, such as elliptical, so long as each path consists of an endless loop.

The facing blades in the embodiment described herein are of the same size. But blades of different lengths may be used instead to shift the cutting point to one side of the descending stream of molten glass. Such a shifting effectively prevents the gathering of shear marks around the center of gobs.

What is claimed is:

1. An apparatus for cutting into gobs a stream of molten glass descending from a glass feeder, said apparatus comprising:

a housing adapted to be disposed immediately below the glass feeder;

first and second vertically elongated blade holders operably mounted to said housing and having upper ends, respectively;

first and second horizontally elongated shear blades fixed to said upper ends of said first and second blade holders, respectively;

first means for rotating said first blade holder about a horizontal axis in such a manner that said first shear blade is rotated along a first continuous loop-shaped path, while maintaining said first blade holder in a vertical orientation and said first shear blade in a horizontal orientation;

second means for rotating said second blade holder about a horizontal axis in such a manner that said second shear blade is rotated along a second continuous loop-shaped path, which intersects said first loop-shaped path, while maintaining said second blade holder in a vertical orientation and said second shear blade in a horizontal orientation;

said first means comprising a first bottom driven gear rotatably mounted to said housing for rotation about a first bottom axis, a first top driven gear rotatably mounted to said housing at a position spaced vertically above said first bottom driven gear for rotation about a first top axis, a first bottom crank arm coupled with said first bottom driven gear for rotation about a first bottom crank axis, a first top crank arm coupled with said first top driven gear for rotation about a first top crank axis, a first top pivot element pivotably mounting a top portion of said first blade holder to said first top crank arm, and a first bottom pivot element pivotably mounting a bottom portion of said first blade holder to said first bottom crank arm; and said second means comprising a second bottom driven gear rotatably mounted to said housing for rotation about a second bottom axis, a second top driven gear rotatably mounted to said housing at a position spaced vertically above said second bottom driven gear for rotation about a second top axis, a second bottom crank arm coupled with said second bottom driven gear for rotation about a second bottom crank axis, a second top crank arm coupled with said second top driven gear for rotation about a second top crank axis, a second top pivot element pivotably mounting a top portion of said second blade holder to said second top crank arm, and a first bottom pivot element pivotably mounting a bottom portion of said second blade holder to said second bottom crank arm.

2. An apparatus as recited in claim 1, further comprising a drive gear rotatably mounted to said housing for rotation about a drive axis and operably meshed with said first top driven gear and said first bottom driven gear; and wherein said drive gear, said first top driven gear, and said first bottom driven gear are mounted to said housing at positions such that said drive axis, said first top axis, and said first bottom axis form vertices of a first isosceles triangle having a base line extending between said first top axis and said first bottom axis.

3. An apparatus as recited in claim 2, wherein said drive gear, said second top driven gear, and said second bottom driven gear are mounted to said housing at positions such that said drive axis, said second top axis, and said second bottom axis form vertices of a second isosceles triangle having a base line extending between said second top axis and said second bottom axis.

4. An apparatus as recited in claim 3, further comprising an intermediate gear rotatably mounted to said housing for rotation about an intermediate axis and operably meshed with each of said drive gear, said second top driven gear, and said second bottom driven gear.

5. An apparatus as recited in claim 4, wherein said intermediate gear, said second top driven gear, and said second bottom driven gear are mounted to said housing at positions such that said intermediate axis, said second top axis, and said second bottom axis form vertices of a third isosceles triangle having a base line extending between said second top axis and said second bottom axis.

6. An apparatus as recited in claim 1, further comprising a drive gear rotatably mounted to said housing for rotation about a drive axis and operably meshed with said first top driven gear and said first bottom driven gear; and an intermediate gear rotatably mounted to said housing for rotation about an intermediate axis and operably meshed with each of said drive gear, said second top driven gear, and said second bottom driven gear.

7. An apparatus as recited in claim 1, further comprising drive means mounted to said housing for rotating said drive gear.

8. An apparatus as recited in claim 7, wherein said drive means comprises an output gear operably meshed with said drive gear.

9. An apparatus as recited in claim 7, wherein said drive means further comprises a servomotor having an output shaft, said output gear being fixed to said output shaft of said servomotor.

10. An apparatus as recited in claim 1, further comprising drive means for selectively rotating said drive gear at different speeds so as to allow said first and second shear blades to be rotated at different speeds to coordinate the rotation speed of said first and second shear blades with a descending speed of the stream of molten glass.

11. An apparatus as recited in claim 1, further comprising a drive gear rotatably mounted to said housing for rotation about a drive axis and operably meshed with said first top driven gear and said first bottom driven gear; and wherein said first top crank axis, said first bottom crank axis, said first top axis, and said first bottom axis are in parallel with said drive axis.

* * * * *